US006978795B2

(12) United States Patent
Perrin

(10) Patent No.: US 6,978,795 B2

(45) Date of Patent: Dec. 27, 2005

(54) DIVERTER VALVE

(75) Inventor: Robert Brian Perrin, Essex (GB)

(73) Assignee: Avilion Limited, Rainham (GB)

( * ) Notice: Subject to any disclaimer, the term of this patent is extended or adjusted under 35 U.S.C. 154(b) by 96 days.

(21) Appl. No.: 10/132,708

(22) Filed: Apr. 26, 2002

(65) Prior Publication Data

US 2002/0162586 A1 Nov. 7, 2002

(30) Foreign Application Priority Data

Apr. 27, 2001 (GB) .................................... 0110425
Mar. 27, 2002 (GB) .................................... 0207271

(51) Int. Cl.[7] ............................................ F16K 11/048
(52) U.S. Cl. .................. 137/119.04; 137/544; 137/594
(58) Field of Search .................... 137/119.03, 119.045, 137/119.05, 594, 544

(56) References Cited

U.S. PATENT DOCUMENTS

| | | | | |
|---|---|---|---|---|
| 2,949,933 A | | 8/1960 | Moen | 137/625.17 |
| 4,556,484 A | * | 12/1985 | Hunter et al. | 137/798 |
| 4,577,653 A | | 3/1986 | Marty | 137/119 |
| 4,609,006 A | | 9/1986 | Parkison et al. | 137/119 |
| 5,417,348 A | | 5/1995 | Perrin et al. | 222/129.1 |
| 5,752,541 A | | 5/1998 | Gonzalez | 137/119.04 |
| 5,778,921 A | | 7/1998 | Ko | 137/119.04 |
| 5,881,754 A | | 3/1999 | Wei | 137/119.04 |
| 6,062,249 A | | 5/2000 | Givler | 137/119.04 |

FOREIGN PATENT DOCUMENTS

| | | | |
|---|---|---|---|
| DE | 3413616 A1 | 4/1984 | F16K 11/00 |
| EP | 0 775 860 A2 | 9/1994 | F16K 11/00 |
| FR | 2 444 872 | 12/1978 | F16K 11/04 |
| WO | WO 96/30681 | 10/1996 | F16K 11/02 |

OTHER PUBLICATIONS

Biflo Nozzles for Sink Fittings, Series 4 and 5 (Current Design) , Barking Brassware Co. Limited.

* cited by examiner

*Primary Examiner*—Stephen M. Hepperle
(74) *Attorney, Agent, or Firm*—Baker & Hostetler LLP

(57) ABSTRACT

A diverter valve comprises a housing having inlets, a first outlet, and a second outlet. The inlets are connected to hot and cold water supplies, and mixing of the hot and cold water occurs both inside the housing and inside a mixing chamber external to the valve. The first outlet is connected to a spout, and the second outlet is connected to a spray unit. A valve element is mounted in the housing, movable between a closed position and an open position with respect to the first outlet. A piston member comprising a first piston at the bottom end of the valve element, and a second smaller piston at the top end of the valve is responsive to pressure differential between the second outlet and the inlet for movement to a first and second position. When a lower pressure exists at the second outlet, the piston member moves to the second position, closing off the first outlet. The valve also includes a flow regulator to regulate the flow through the second outlet. Fluid is directed into the flow regulator by channels running through the bottom piston. The flow regulator allows pressure to build up inside the valve, providing an increased closure force on the second outlet when the first outlet is open. An inverted cup washer prevents fluid leakage from the second exit by any other route than through the flow regulator. Build up of water inside this cup washer pushes it against the housing, providing an anti-knocking mechanism. The diverter valve may be included in a faucet assembly along with a separate isolated channel for filtered water.

32 Claims, 15 Drawing Sheets

DIVERTER VALVE

INTRODUCTION AND BACKGROUND

This invention relates to valve structures and more particularly to a diverter valve that incorporates an improved closure mechanism and anti-knocking mechanism.

Diverter valves are commonly used in water tap or faucet assemblies to divert water between a spout and a hand spray. When the spray is operated, the diverter valve shuts off the flow of water to the spout. When the spray is shut off, the diverter valve automatically adjusts to allow water to flow from the spout again. Such systems are particularly used in domestic environments, as well as commercial establishments, A common method of implementing this automatic diverter system is by means of a piston mechanism. The valve comprises a housing containing a valve member shaped to act as a piston. The valve member is movable from a first position, in which the outlet to the spout is open, to a second position, in which the outlet to the spout is closed off. The piston is responsive to a difference in pressure between the spray outlet and the inlet, so that when the spray is open, the piston moves to close off the spout. Additionally, such a valve may comprise both hot and cold water inlets, such that mixing of the hot and cold water occurs. For example, Moen (U.S. Pat. No. 2,949,933) describes a hot and cold water mixing valve, which can also automatically divert the mixed water from a principle outlet passage to an auxiliary outlet passage when a control valve on the auxiliary passage is opened.

However, a problem with existing diverter valves is that they only operate over a limited pressure range. At high pressures, leakage tends to occur. At low pressures, there is not enough force to close the seal on the spout properly, again resulting in leakage.

Another problem is the tendency for knocking to occur. Knocking is when a valve member is quickly moved from one position to the second position and rebounds back, thereby producing an audible hammering effect in the water line. It can be sufficiently loud as to make someone using the spray/spout system to believe that there is something seriously wrong with it. In U.S. Pat. No. 4,577,653 (Masco Corporation), a new design of valve is described, which is intended to reduce knocking of the valve member in the housing. This is achieved largely by prongs at the bottom of the upper housing part which bear on the conical mid-portion of the valve member. However, the design of Masco's valve is extremely complicated. The present invention aims both to improve substantially on the pressure range over which the valve will operate, and to reduce the amount of knocking which occurs, based on a design which is fairly straightforward and easy to construct.

SUMMARY OF THE INVENTION

The present invention provides a diverter valve, comprising a housing having an inlet, a first outlet, and a second outlet, a valve element mounted in said housing, movable between a closed position and an open position with respect to the first outlet, a piston means for moving said valve element, with said piston means being responsive to pressure differential between said second outlet and said inlet such that when a lower pressure exists at said second outlet, said piston means moves said valve element to said closed position. A flow regulator regulates the flow through the second outlet, so that as the water pressure in the housing increases, the restricting effect on the flow by the flow regulator increases, and as the water pressure in the housing decreases, the restricting effect on the flow by the flow regulator decreases.

Preferably, the piston means comprises a first piston at the bottom end of the valve element, and a second piston at the top end of the valve element. The first piston has a larger effective cross section than the second piston, resulting in the fluid in the chamber exerting a larger force on the first piston than on the second piston. The valve additionally comprises a flow regulator adapted to regulate the flow rate through the second outlet. Preferably, the diverter valve includes channelling means for channelling fluid through the flow regulator. Preferably, this fluid channelling means comprises one or more channels running through the length of the first piston. Preferably, the diverter valve also includes leakage prevention means for preventing fluid leakage from the second outlet by any other route than through the flow regulator. Preferably, the leakage prevention means comprises an inverted flexible cup washer, such as of rubber or other suitable polymer material. Preferably, the diverter valve comprises a second inlet, such that hot water enters via the first inlet, and cold water enters via the second inlet, and the hot and cold water mix inside the housing. The hot and cold water may enter the valve independently, or they may partially mix beforehand in a mixing chamber outside the housing.

The first outlet may be connected to a spout, and the second outlet may be connected to a spray. The housing of the valve may be integral with the spout, may be attached to the spout (for example, by welding or soldering) or may be separate from the spout. Having the housing fixed to the spout has the advantage that there are fewer parts to put together during assembly or repair of a tap system which utilises the diverter valve. If the housing was integral with the spout, they could be manufactured as a single item.

It is also possible to have a separate channel by which filtered water can pass through to the spout, but not to the spray. This would be useful to provide drinking water from the same spout as is used for hot/cold water in a sink.

BRIEF DESCRIPTION OF THE DRAWINGS

The preferred embodiments of the present invention will now be described by way of example with reference to the accompanying drawings, in which:

FIG. 5A shows a bottom view and FIG. 5B shows a side view;

FIG. 6A gives a bottom view, FIG. 6B is a cross-section along line A—A of FIG. 6A, and FIG. 6C shows the fitting mechanism of the flow regulator in more detail;

FIG. 8A is a side view; FIG. 8B is an underneath view; FIG. 8C is a cross section through line A—A of FIG. 8C; FIG. 8D is a perspective view from above and FIG. 8E is a perspective view from below.

FIG. 9A is a side view, FIG. 9B is a top view, FIG. 9C is a cross sectional view along line A—A of FIG. 9B, FIG. 9D is a cross sectional view along line B—B of FIG. 9B and FIG. 9E is a perspective view from above;

FIG. 10A is a base view and FIG. 10B is a cross sectional view along line A—A of FIG. 10A;

FIG. 11A shows a side view, FIG. 11B shows a top view, FIG. 11C shows a cross section through line A—A of FIG. 11B, FIG. 11D shows a cross sectional view through line B—B of FIG. 11A, and FIG. 11E shows a side perspective view;

FIG. 13A shows a front view, FIG. 13B shows a side view, FIG. 13C shows a cross section through line A—A of FIG. 13B, FIG. 13D shows a cross section through line B—B of FIG. 13A, FIG. 13E shows a cross section through line C—C of FIG. 13A) FIG. 13F shows a cross sectional view through line D—D of FIG. 13B, and FIG. 13G shows a base view;

DESCRIPTION OF THE PREFERRED EMBODIMENTS

Figure 1:
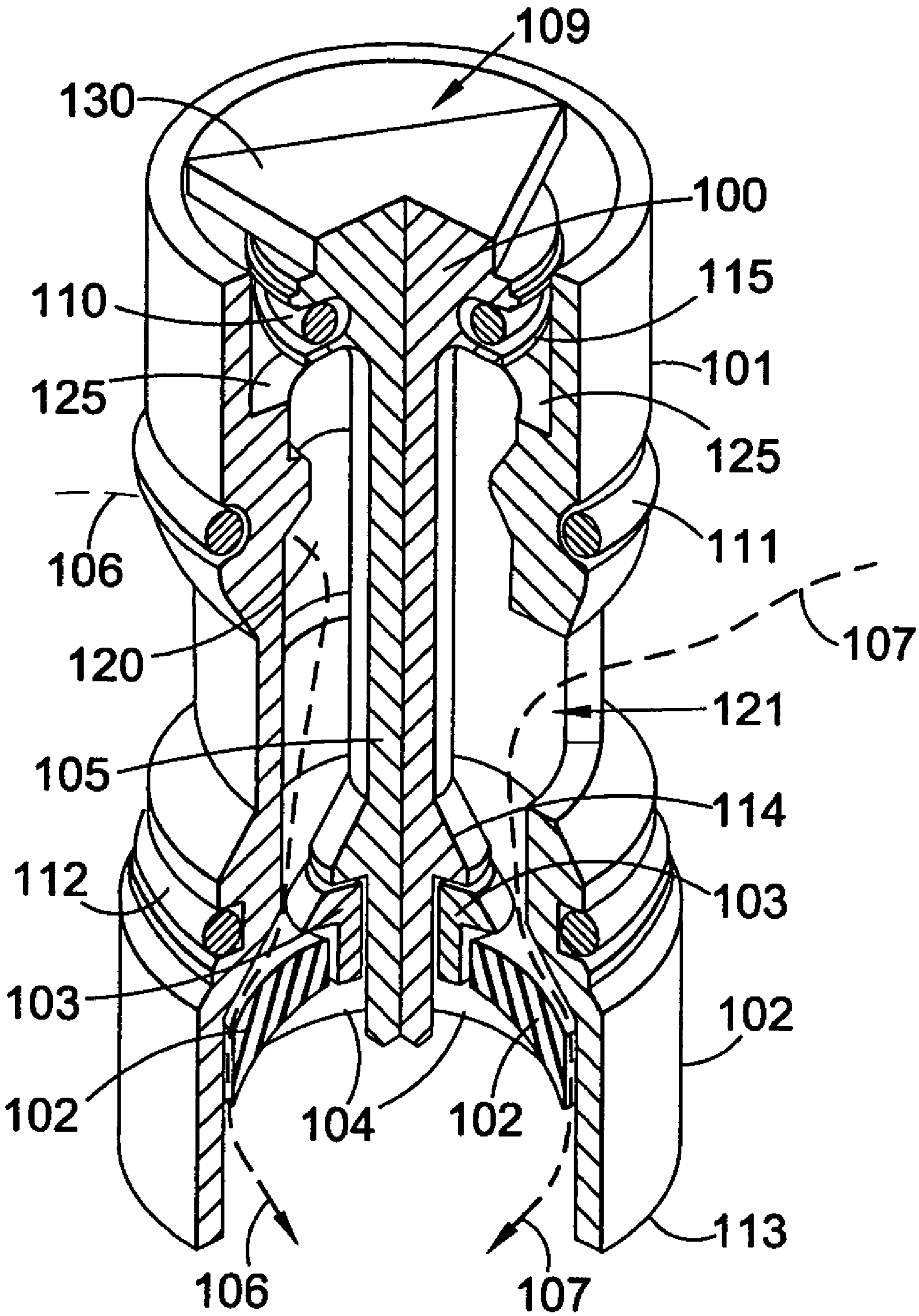
FIG. 1 shows a perspective view of a prior art design of diverter valve.

FIG. 1 shows a prior art design of valve, in which a brass or plastic valve member 100 is contained within a brass housing 101. The valve has two inlets 120, 121 and two outlets 109, 113. The two inlets are used for hot and cold water. The path of the water, with the valve member 100 in the position shown, is indicated by arrows 106 and 107. The inlets 120,121 access a common channel outside the housing with hot and cold water fed to the channel, so that mixed hot and cold water enters the housing, followed by further mixing inside the housing. The bottom outlet 113 is for connection to a spray unit and the top outlet 109 is for connection to a nozzle or spout. The valve member 100 is shaped in the form of a stem 105 with a piston 115 on the top end and a piston element 114 on the bottom end. The top piston 115 also acts as a closure element for the outlet 109 to the spout. The housing just below the top piston 115 is shaped with a ledge 125 on which the piston 115 rests in order to close off the spout outlet 109. An O-ring seal 110 is located on the valve member 100 just above the top piston 115, allowing the nozzle outlet 109 to be sealed shut when the valve member 100 is pushed downwards. On the end of the valve member 100, next to the top piston 115, is a triangular shaped guide 130 which guides the upper part of the valve member 100 within the housing 101 to minimise vibration. The effect of the triangular shape is to give a larger cross section to the waterway than, for example, a square shape. At the bottom of the valve, a rubber cup washer 102 is held in position between a bush 103 and a clip 104. A lower piston is formed comprising both the bottom piston element 114 and the rubber cup washer 102. The rubber cup washer effectively increases the area of the bottom piston beyond that of the bottom piston element 114 alone. Thus, the effective cross-section area of the bottom piston is larger than of the top piston 115 The flow of fluid to the spray is restricted by having to pass around the outer edge of the rubber cup washer 102. On the outside of the housing are O-ring seals 111, 112 to allow sealed connections to be made to the spout and spray outlets, such that the outflow from these outlets can be isolated from each other and from the inlets. The entire housing fits within a cavity in a body of a faucet system. The central portion of the housing 101 acts as a pressure chamber 108.

In operation, hot 106 and cold 107 water come into the pressure chamber 108. With the spray unit closed water will not flow through outlet 113. The faucet spout (connected to outlet 109) is always open so water can flow through that. Thus there is a pressure differential on the upper piston 115, but not on the lower piston. The pressure of the water in the pressure chamber 108 thus forces the valve member 100 upwards towards outlet 109, so that water flows through the outlet 109. When the spray unit is opened, water can flow through outlet 113, and so there is now a pressure differential across both pistons 114,115 Due to the lower piston having a larger surface area than the upper piston 115, the downward force (towards outlet 13) is greater than the upward force (towards outlet 109). The valve member 100 therefore moves downwards in the housing 101, losing off the water supply to the nozzle, and causing the water to force past the rubber cup washer 102. It will be appreciated that when we refer to ‘upwards’ and ‘downwards’ this refers to the direction of the outlets 109,113. In use, the housing 101 could be mounted in any orientation.

Figure 2:
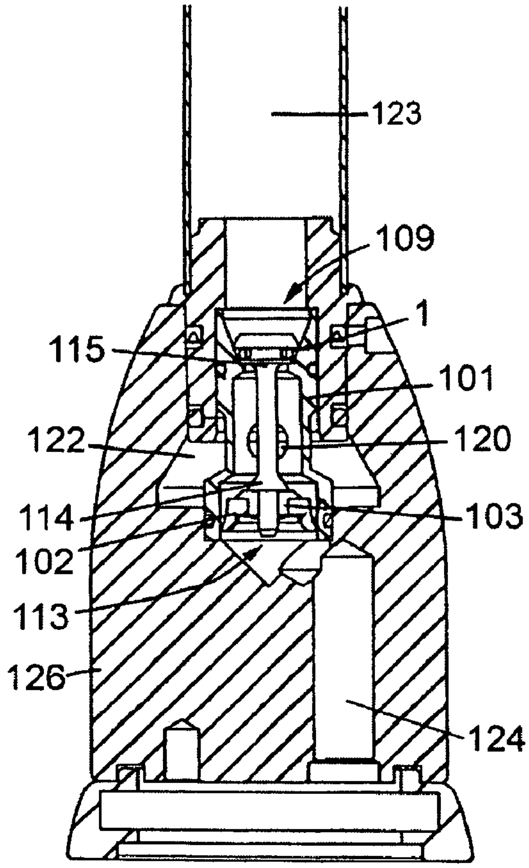
FIG. 2 shows a sectional view of the valve of FIG. 1, located within an outer body.

FIG. 2 shows a sectional view of the diverter valve of FIG. 1 located within an outer body 126 of a tap or faucet. A mixing chamber 122 is provided in the outer body 126 in which the hot and cold water partially mix before entering the valve. Mixing is then completed inside the pressure chamber 108. The lower end of a top nozzle 123 is shown fluidly connected to outlet 109. A channel 124 connects with outlet 113 and leads to a spray unit (not shown).

The valve of FIGS. 1 and 2 operates in a range between 1 bar and 6 bar. Above 6 bar, there is a tendency for leakage from the spout when diverted to spray, especially with hot water. This is due to the lip of the rubber cup washer 102 softening and being dragged inwards by the flow of water. A pressure drop occurs in the central portion of the housing 108, and thus some of the closing force on the nozzle seal 110 is lost. The valve of the invention has been designed to avoid this problem, and also to incorporate a simple mechanism to reduce knocking.

Figure 3:
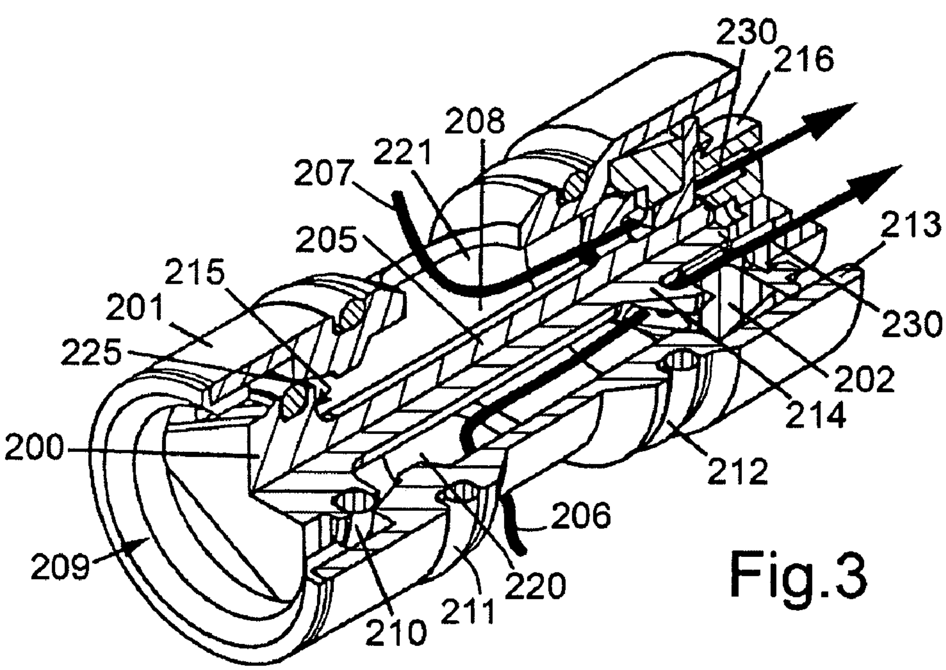
FIG. 3 shows a perspective view of the diverter valve according to a first embodiment of the invention.

FIG. 3 shows a valve according to a first embodiment of the invention. The arrangement is generally similar to the arrangement of FIGS. 1 and 2. The rubber cup washer 202 has been inverted to trap the water and form a seal between the outer lip of the washer 202 and the housing 201. Again, the rubber cup washer 202 and the lower piston element 214 together form a lower piston, with larger effective cross section than the top piston 215. The valve has a central waterway comprising several channels 219 through which the flow of water is routed to a standard flow regulator 216 that restricts the flow to a substantially constant rate over a range of water pressure. This results in an increase in pressure in the pressure chamber 208, producing a much improved seal on the nozzle. The valve of the invention works between 1 bar and 10 bar. An additional beneficial effect is that the pressure of the water pushes and locks the cup washer 202 against the inside of the housing 201, reducing the tendency for the valve member 200 to shuttle back and forth, hence reducing the chance of knocking.

Figure 4A:
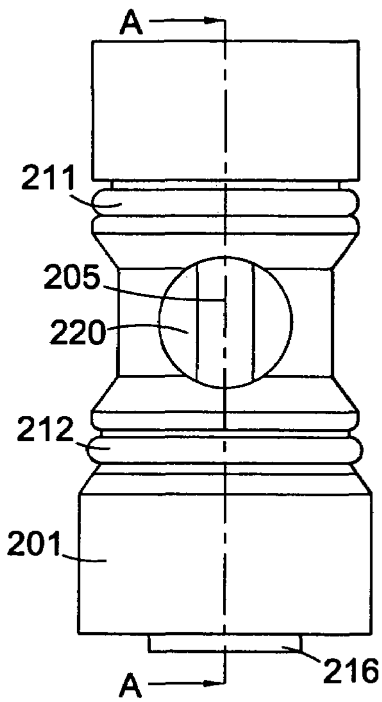
FIG. 4A shows a side view of the valve of FIG. 3.
Figure 4B:
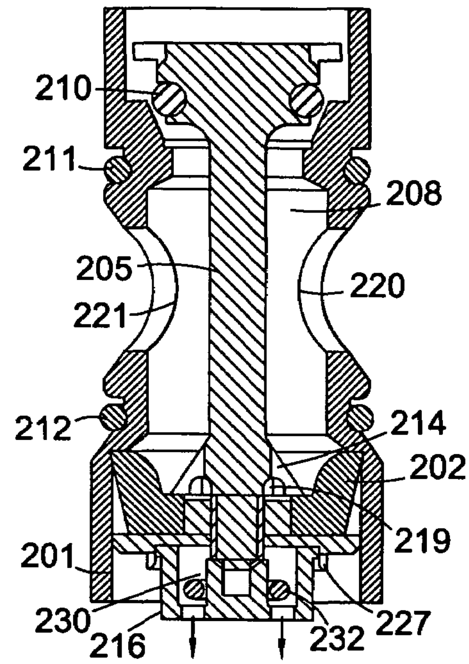
FIG. 4B gives a sectional view along line A—A of FIG. 4A.

FIG. 4A shows a side view of the valve of the first embodiment. A sectional view along line A—A is given in FIG. 4B. The structure of the flow regulator 216 can be seen, where channels 230 allow fluid to pass through at a controlled rate. The flow regulator 216 is snapped into place in the housing 201 by forcing it through a tapered die 227.

Figure 5A:
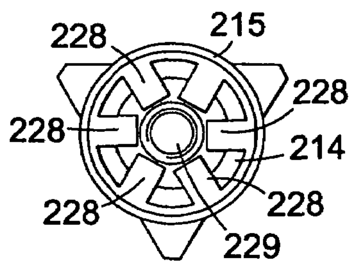
FIGS. 5A and 5B give a more detailed view of channels running through a lower piston element in the valve of FIG. 8.
Figure 5B:
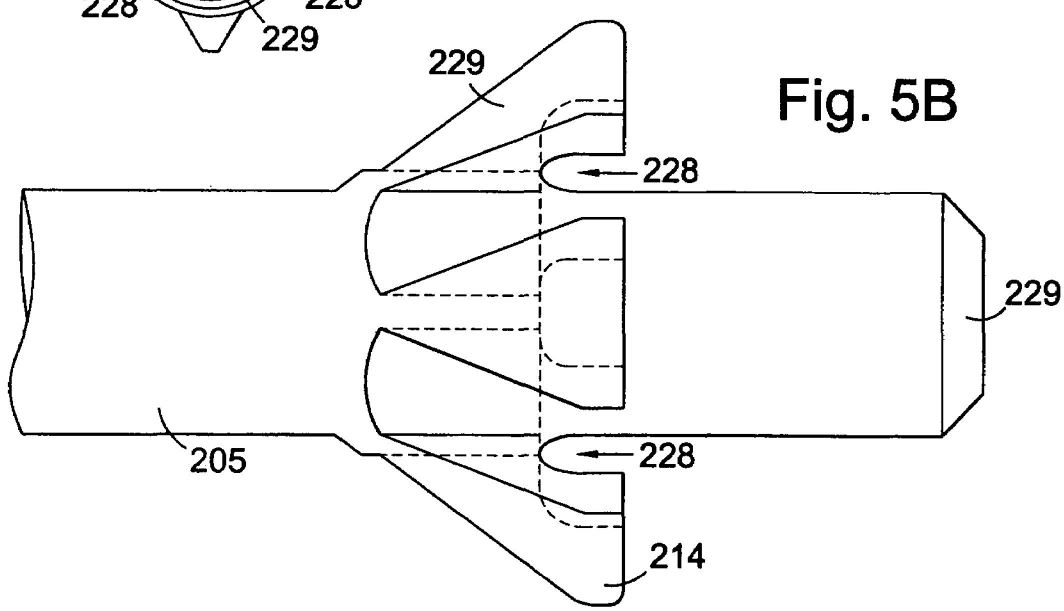

FIG. 5 shows more detail of the channels through the lower piston. FIG. 5A shows a bottom view of the valve member, wherein six channels 228 are formed through the lower piston element 211 The edges of the top piston 215 can be seen behind the bottom piston element 214. The lower end 229 of the valve member can be seen in the centre of the figure. FIG. 5B shows a side view of the lower piston element 214. The six channels 228 extend through the tapered piston surface 229.

Figure 6A:
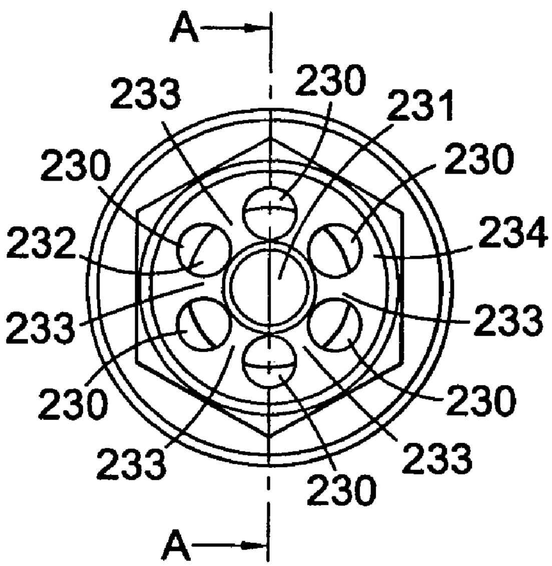
FIGS. 6A to 6C show a flow regulator.

FIG. 6 shows the flow regulator in more detail. FIG. 6A gives a rear view, showing the six outlet channels 230 in the body 234 of the flow regulator. The flow regulator has a central pillar 231, one end of which is fixed to the body 234 of the flow regulator. The other end of the central pillar 231 has a splayed shape, enabling the central pillar 231 to retain an O-ring 232 looped around it. The O-ring 232 is made of an elastic material.

When the pressure in the waterway is increased, the O-ring 232 is forced against the restricting bars 233 surrounding the outlet channels 230 in the body 234 of the flow regulator. The higher the pressure, the more the O-ring 232 becomes flattened, thus progressively reducing the size of the waterway. In this way, a constant flow of water is maintained.

Figure 6B:
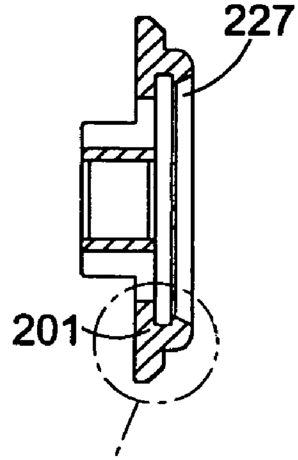
Figure 6C:
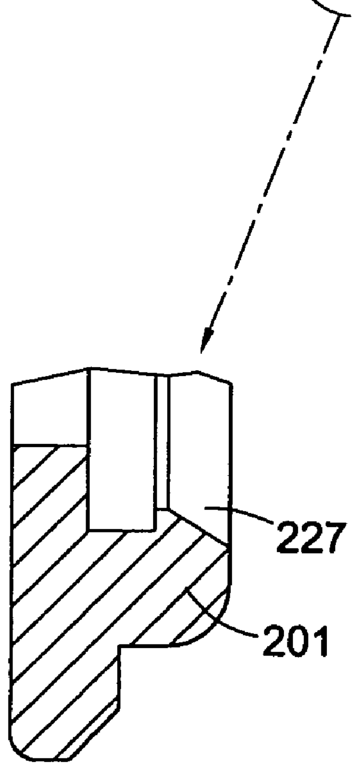

FIG. 6B shows a section along line A—A of FIG. 6A. The flow regulator 216 is attached to the housing 201 by a snap fastening means comprising a tapered die 227. FIG. 6C shows this snap fastening means in more detail.

The embodiment of FIGS. 3 to 6 functions in the same general manner as the prior art embodiment of FIGS. 1 and 2, with the valve moving to close off the outlet 209 when the spray nozzle is opened. Water in chamber 208 then flows through channels 280 to the spray outlet. When the spray outlet is closed, valve member 200 moves towards nozzle outlet 209, opening the flow channel through to the faucet nozzle.

Figure 7:
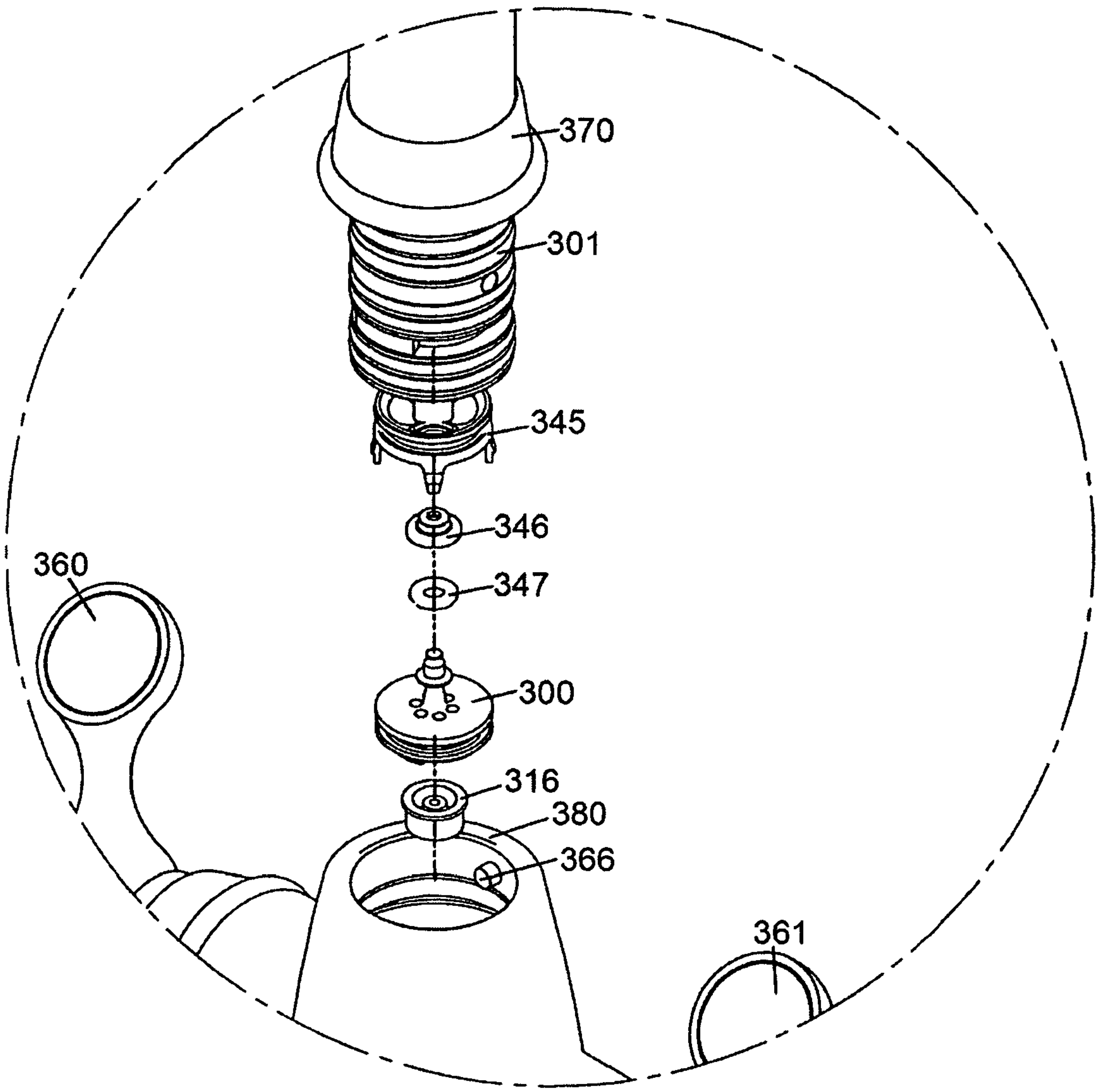
FIG. 7 is an exploded perspective view of a second embodiment of the present invention.
Figure 8A:
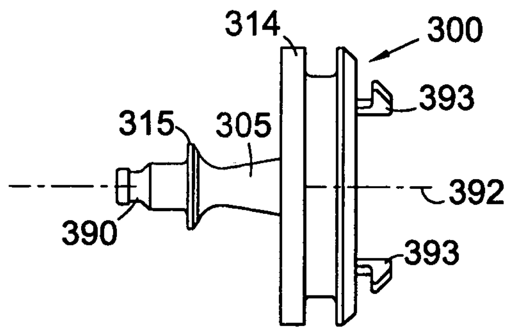
FIGS. 8A to 8E show a detailed view of a valve member of the second embodiment.
Figure 8B:
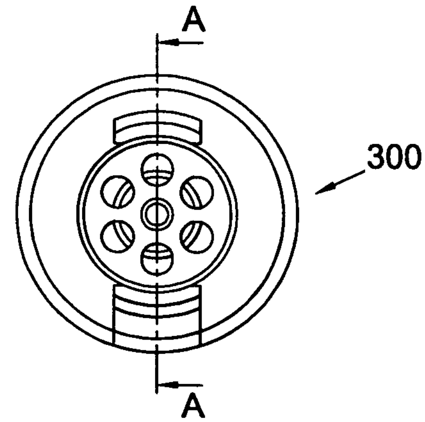
Figure 8C:
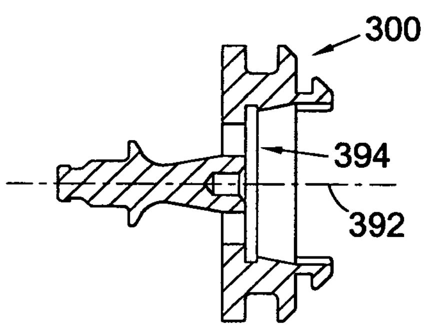
Figure 8D:
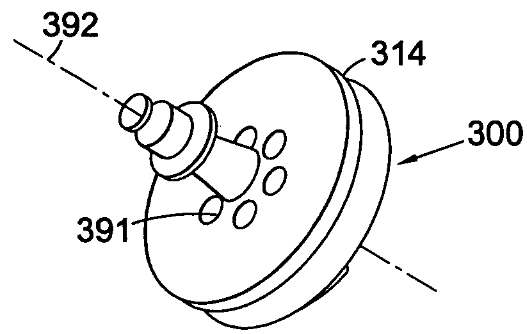
Figure 8E:
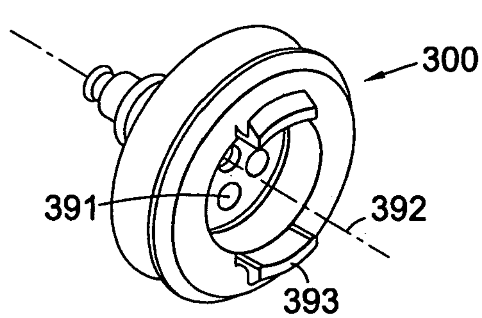
Figure 9A:
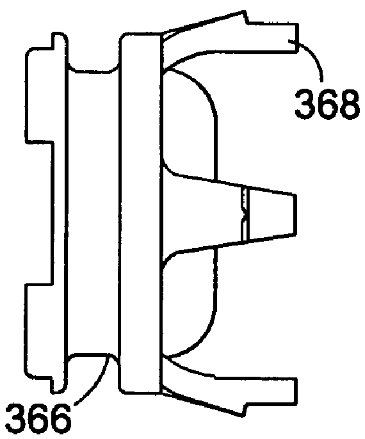
FIGS. 9A to 9E show a detailed view of an upper valve housing of the second embodiment.
Figure 9B:
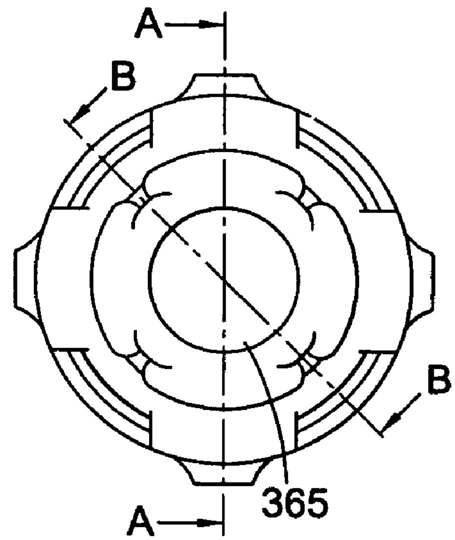
Figure 9C:
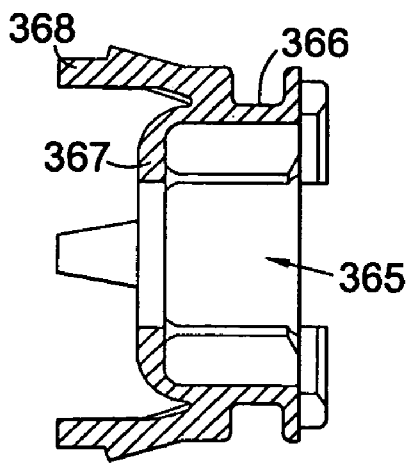
Figure 9D:
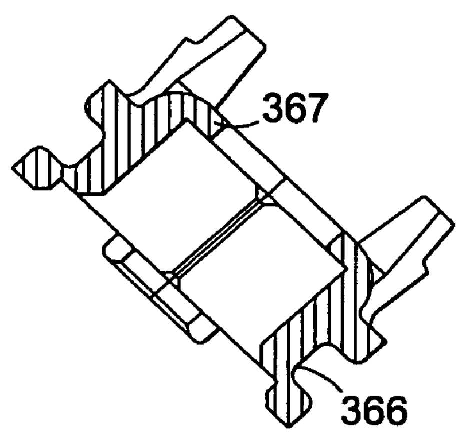
Figure 9E:
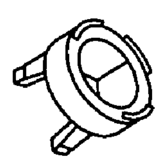

FIGS. 7 to 18 show a second embodiment of the invention, in which the valve housing is integrated with the spout of the faucet. As shown in FIG. 7, the valve assembly comprises an outer housing 301 which is attached to the inlet end 370 of the spout 371. In this embodiment, the outer housing 301 is soldered to the spout with a solder ring placed in a groove in the outer housing 301. The solder joint is concealed by a decorative ring held in place by an O-ring.

An upper valve housing part 845 is inserted into the outer housing 301, and sealed against it using an O-ring. A guide plate 346 and seating O-ring 347 are fitted into a channel 365 (FIG. 9) in the upper valve housing 345. The end of the valve member 300 is fastened to the guide plate 346. A flow regulator 316, of similar design to the flow regulator 216 of the first embodiment, is positioned against the lower part of the valve member 300. The lower part of the outer housing 301, containing the valve assembly, is fixed in position inside the faucet body 380, for example, by using a grub screw 366.

The individual parts of the valve assembly are shown in more detail in FIGS. 8 to 11. FIGS. 8A to 8E show the valve member 300 which comprises a small upper piston 315, a larger lower piston 314 and a stem 305 joining the two pistons. The upper piston 315 has a guide pin 390 attached to its upper surface, which is for engaging with the guide plate 346. The guide plate 846 snap fastens on to the guide pin 390. The valve member 300 has a hollow 394 on the lower surface of the lower piston 814, into which the flow regulator 316 is inserted. The lower piston 314 has a number of holes 391, spaced evenly in a circular pattern around its central axis 392. These holes are positioned such that when the flow regulator 316 is positioned inside the lower piston 314, the holes 391 in the lower piston 314 will align with the holes of the flow regulator 316. Two hooked projections 393 are positioned beside the hollow 394. These allow easy removal of the valve member 300 from the outer housing 301, e.g. during maintenance of the valve assembly, by levering the valve member 300 out using a screwdriver inserted against one of the hooked projections 393.

FIGS. 9A to 9E show the upper valve housing 345 on enlarged scale. It has a channel 365, running though it to allow water to pass through into the spout when the valve is open. The channel has a circumferential lip 367 on the bottom part of its inner surface. In operation, the upper piston 315 of the valve member 300 is located inside the channel 365, and presses downwards against the lip 367 to seal off the channel 365 when the valve is in a closed position.

Figure 10A:
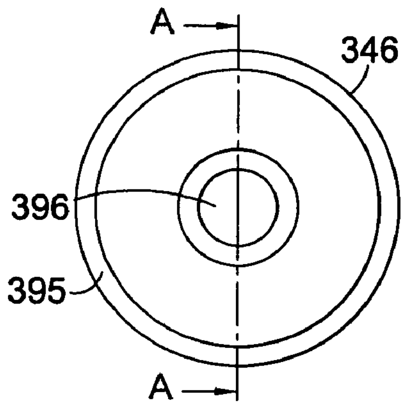
FIGS. 10A to 10B show a detailed view of the guide plate of the second embodiment.
Figure 10B:
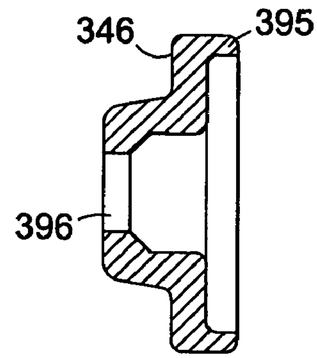
Figure 11A:
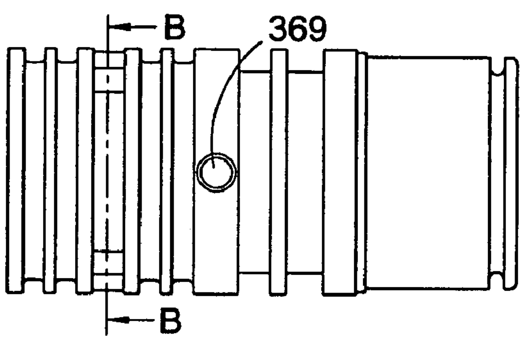
FIGS. 11A to 11E show a detailed view of an outer housing of the second embodiment.
Figure 11B:
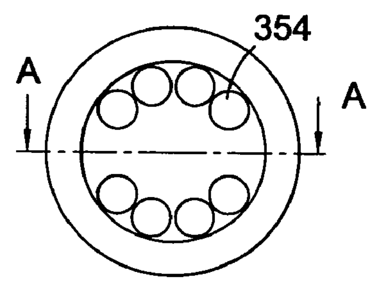
Figure 11C:
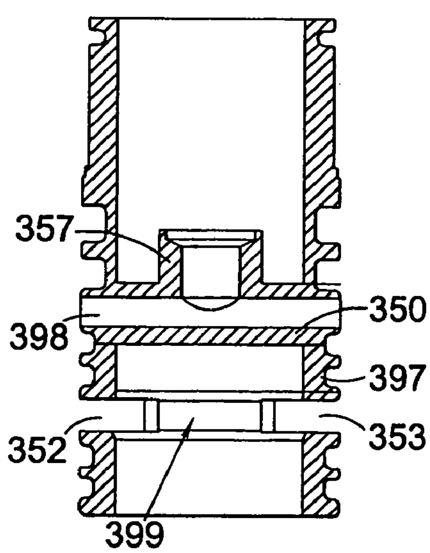
Figure 11D:
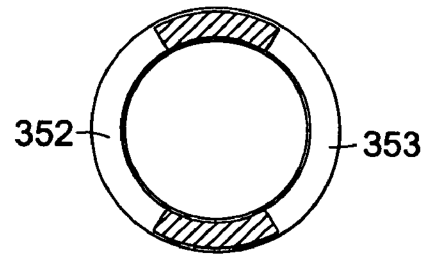
Figure 11E:
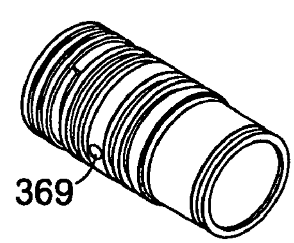

FIGS. 10A and 10B show the guide plate 346. This has a central channel 396, into which the pin 390 of the valve member is inserted. The guide plate 346 also has a lip 395 protruding upwardly from the circumference of its top surface. The seating O-ring 347 (FIG. 7) is positioned against the guide plate 346, and against the inner circumference of the lip 395.

FIGS. 11A to E show the outer housing 301. The lower part of the outer housing 301 (as viewed in FIG. 11C) accommodates the upper valve housing 345 and the valve member 300. The lower part of the outer housing 301 acts as a pressure chamber 399 for the valve assembly. Hot and cold water enter the pressure chamber via side inlets 352, 353. The outer housing 301 has a barrier 350 separating its lower and upper parts. The upper valve housing 345 is seated against the lower surface of the barrier 350. The top part of the outer housing 301 is attached to the spout 371 and any water flowing into the top part passes through and out of the spout 371. The barrier 350 contains a series of holes 354 (FIG. 11B) through which the hot/cold water mixture may pass when the valve is in an open position. The barrier 350 also contains a separate central channel 398 which runs in a horizontal direction, and connects has a separate central outlet 357 to the spout 371. Filtered water may flow through this channel 398, by-passing the valve system, and exiting into the spout 371. The outer housing 301 has a series of circumferential grooves 397 around its outer surface, which can each accommodate an O-ring in order to seal the outer housing 301 against the inside of the faucet assembly 380. Faucets delivering hot, cold and filtered water are well known and described, fro example, in EP-A-501989

Figure 12:
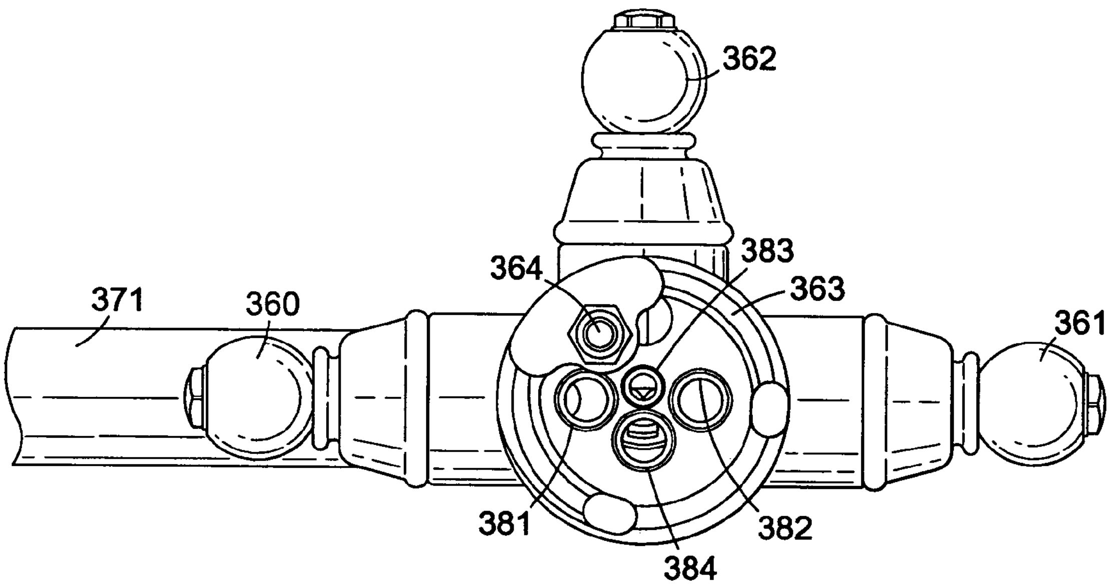
FIG. 12 shows a base view of the faucet assembly incorporating the second embodiment.

FIG. 12 shows an underneath view of the faucet assembly. The faucet assembly has three inlet pipes—a hot water inlet 381, a cold water inlet 382, and a filtered water inlet 383.

Each inlet has a control valve 360, 361, 362 associated with it, to control the flow of water. The faucet assembly also has an outlet pipe 384 running through it. This outlet leads to the spray.

When the spray is opened, hot and cold water which have been mixed together in the valve assembly are diverted to this outlet 384. When the spray is closed, all the water passes out via the spout 371. The clamp plate 363 and clamp nut 864 used to fix the faucet to a surface are also shown.

Figure 13A:
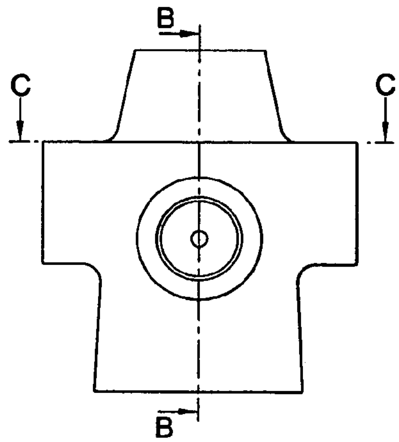
FIGS. 13A to 13G show details of the faucet assembly of FIG. 2.
Figure 13B:
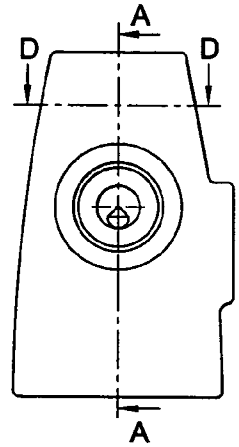
Figure 13C:
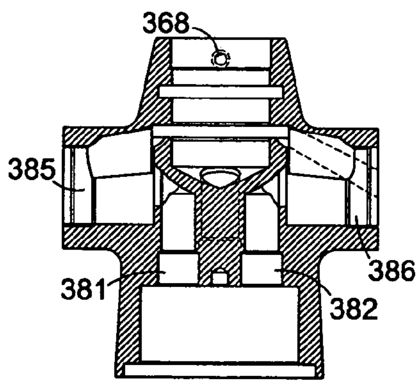
Figure 13D:
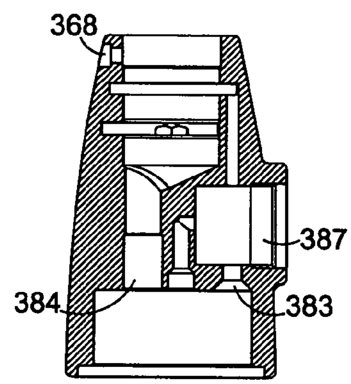
Figure 13E:
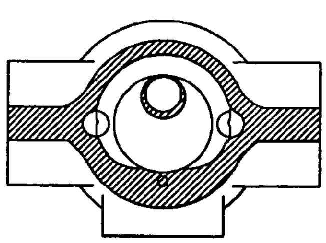
Figure 13F:
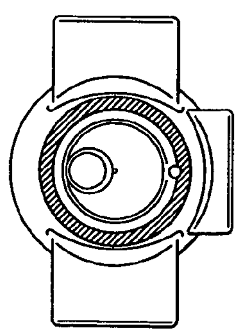
Figure 13G:
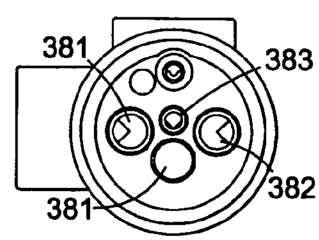

FIGS. 13A to 13E show side views and cross sectional views of the faucet assembly, and FIG. 13F shows a base view. FIG. 13C corresponds to cross section A—A on FIG. 13B, and FIG. 13D corresponds to cross section B—B. The housing or spaces for the hot 385, cold 386 and filtered 387 water valves are shown. Each space 385, 386, 387 is connected to one of the three inlet channels 381, 382, 383. The hot and cold water valve spaces 385, 386 have outlets aligned to lead to the pressure chamber of the outer housing 301. The filtered water valve space 387 has an outlet aligned to lead to the by-pass channel 398 within the outer housing 301.

The faucet assembly also has a hole 368 into which a grub-screw may be inserted, in order to firmly attach the faucet assembly and the outer housing 301 together.

Figure 14:
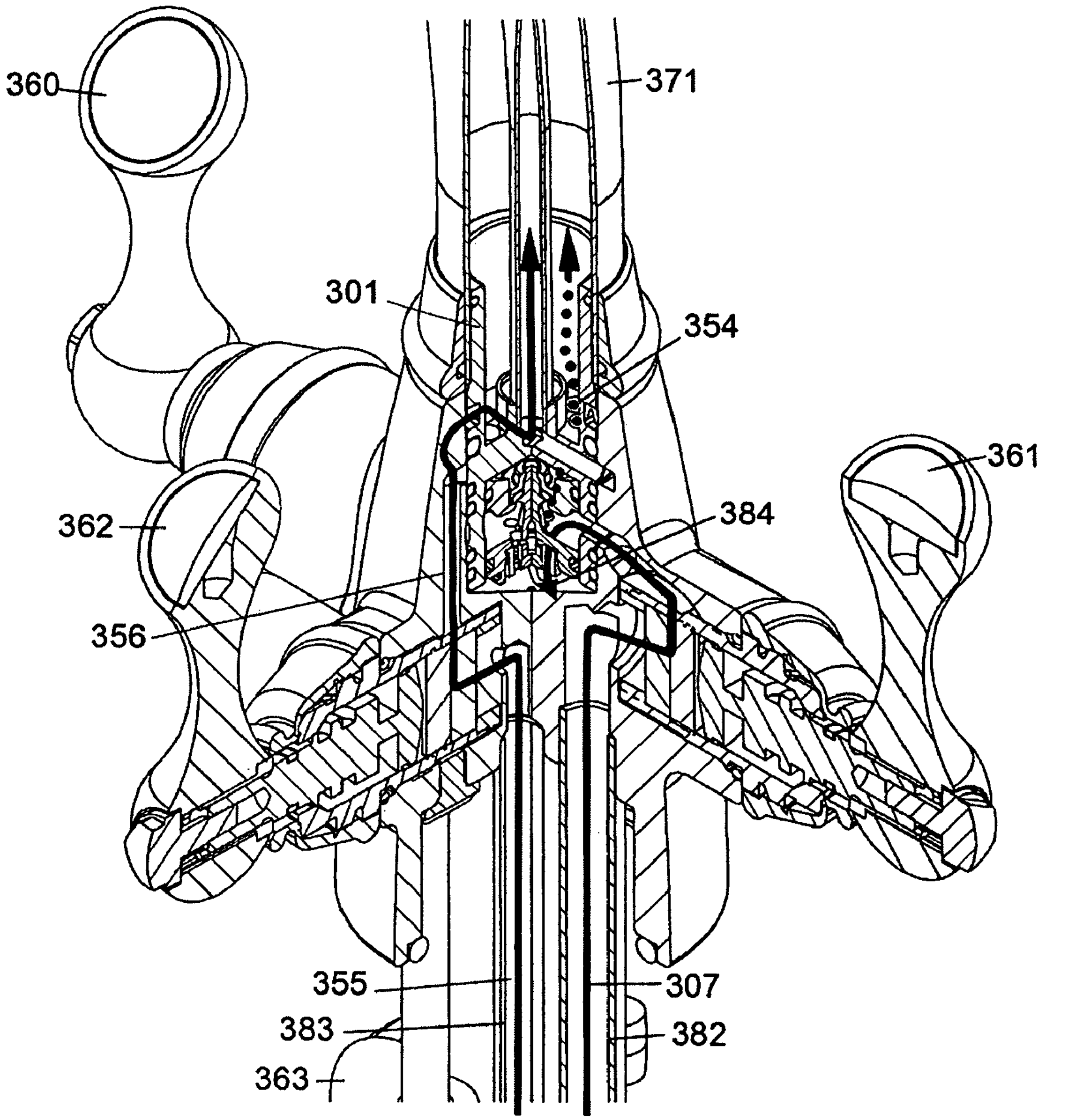
FIG. 14 shows a perspective view of the spout and valve assembly when fixed inside the faucet assembly, according to the second embodiment of the invention.
Figure 15:
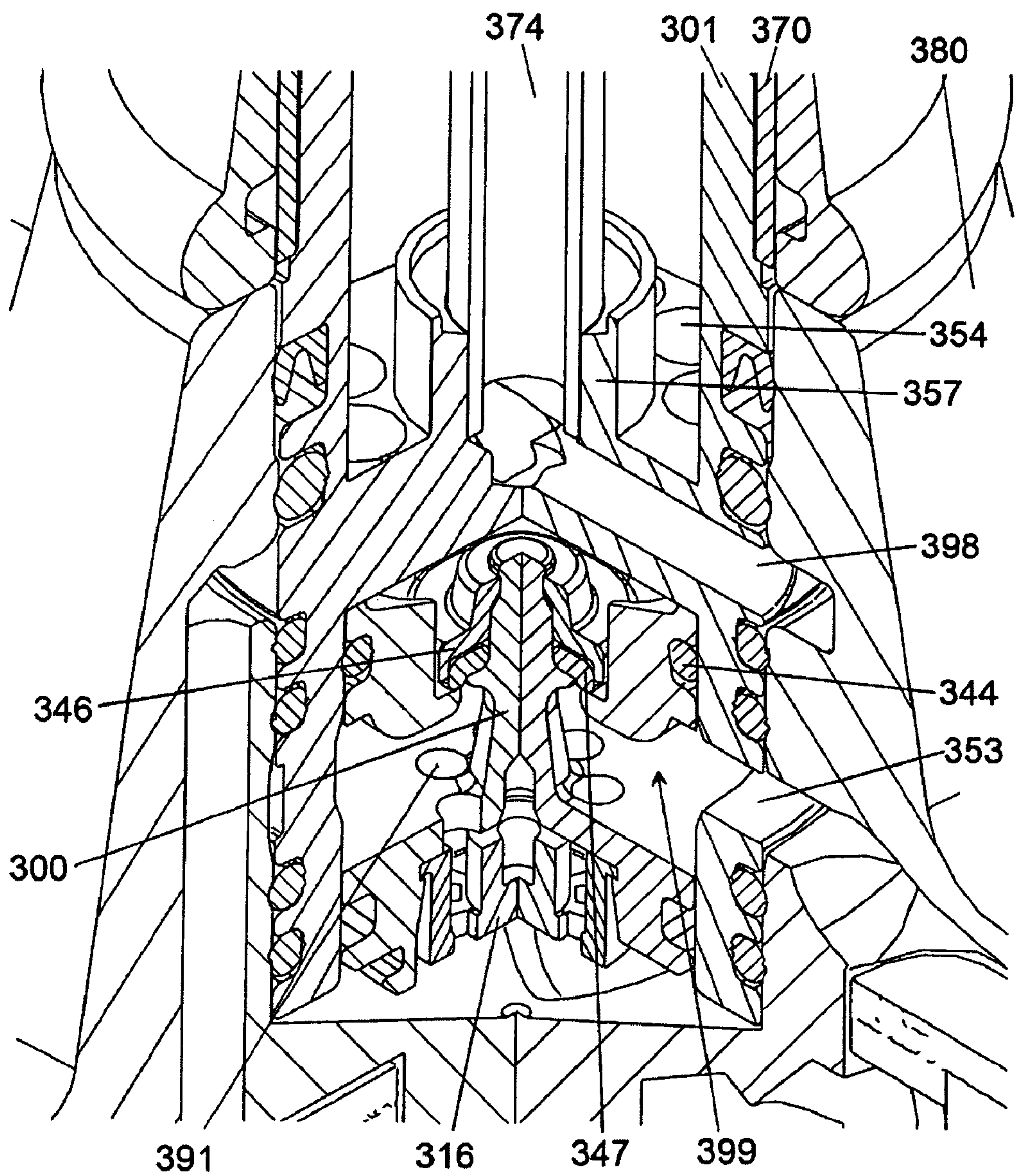
FIG. 15 shows an enlarged view of the valve assembly of FIG. 14.

FIG. 14 shows a perspective view of the valve assembly when fitted inside the faucet assembly 380. FIG. 15 shows an enlarged perspective view of the valve assembly, in which the structures of the valve parts are more clearly shown.

The paths taken by the cold water 307 and the filtered water 355 are shown. The cold water enters the system through the inlet pipe 382 in the faucet assembly 380, and then passes through the cold water valve 361, which controls its flow. It then enters the pressure chamber 399 via the side inlet 353. Hot water enters the pressure chamber 399 by a second similar route, Inside the pressure chamber 399, the hot and cold water mix together. They then exit either by the top exit, to the spout, or by the bottom exit, to the spray, depending on the position of the valve. When the spray outlet is closed, the hot/cold water mixture flows past the top piston 315 and exits to the spout via the channels 354 in the outer housing. When the spray is open, the valve member 300 is forced downwards. This is due to the fact that the bottom piston has a larger surface area than the top piston, so when both pistons have a differential pressure across them, the downward force is greater than the upward force. The upper piston 315 is forced downwards. The guide plate 346, which is fixed to the upper piston 315, is also forced downwards towards the upper housing 345, compressing the O-ring 347 to provide a seal, preventing water from flowing to the spout. The seal can withstand pressures of up to 8 bar. Instead of passing through the spout, the water passes through the channels 391 in the lower piston 314, and through the flow regulator 316 to exit via the spray unit. The flow regulator 316 prevents the water from leaving the pressure chamber 399 too quickly, so that the high pressure can be maintained inside the pressure chamber 399. There is a certain amount of leakage around the sides of the piston, but this is minimised by having the piston and the outer housing machined to high tolerance. There is also preferably a groove in the piston to minimise the noise at higher pressures.

The filtered water 355 does not pass through the valve. It enters the faucet assembly 380 via inlet pipe 383, and its flow is controlled by faucet 362. It then flows through a channel 356 in the faucet assembly which by-passes the valve. The spout has an inner tube 374 within it, and the filtered water passes out through this inner tube 374. It does not, therefore mix with the hot/cold water inside the spout 371. In this embodiment of the invention, there is no pathway by which the filtered water may exit via the spray.

Figure 16:
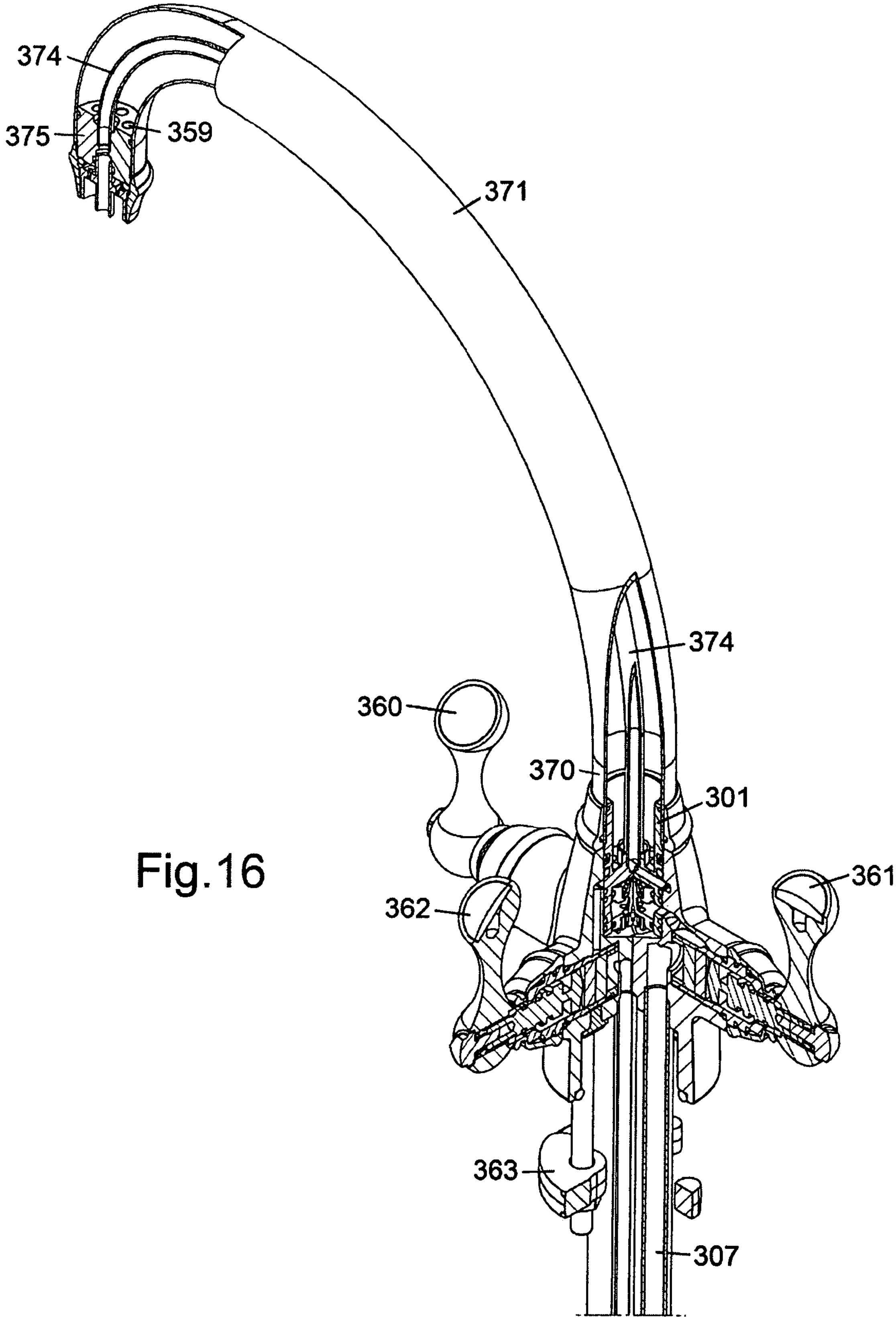
FIG. 16 shows a perspective view of the faucet assembly and spout of the second embodiment.

FIG. 16 shows a perspective view of the spout 371 connected to the faucet assembly. The spout has an end cap 375 comprising a channel through which the inner pipe 374 passes. The end cap 375 also has a series of holes 359 to allow the hot/cold water mixture to exit from the spout 371.

Figure 17B:
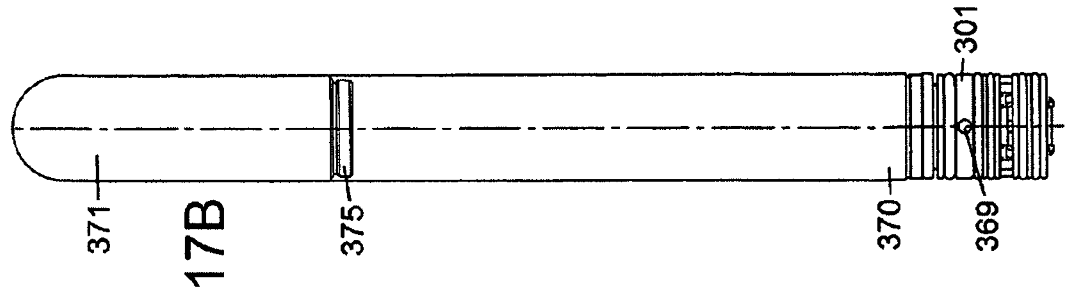
FIG. 17A shows a side view of the spout and FIG. 17B shows a front view of the spout of the second embodiment.
Figure 17A:
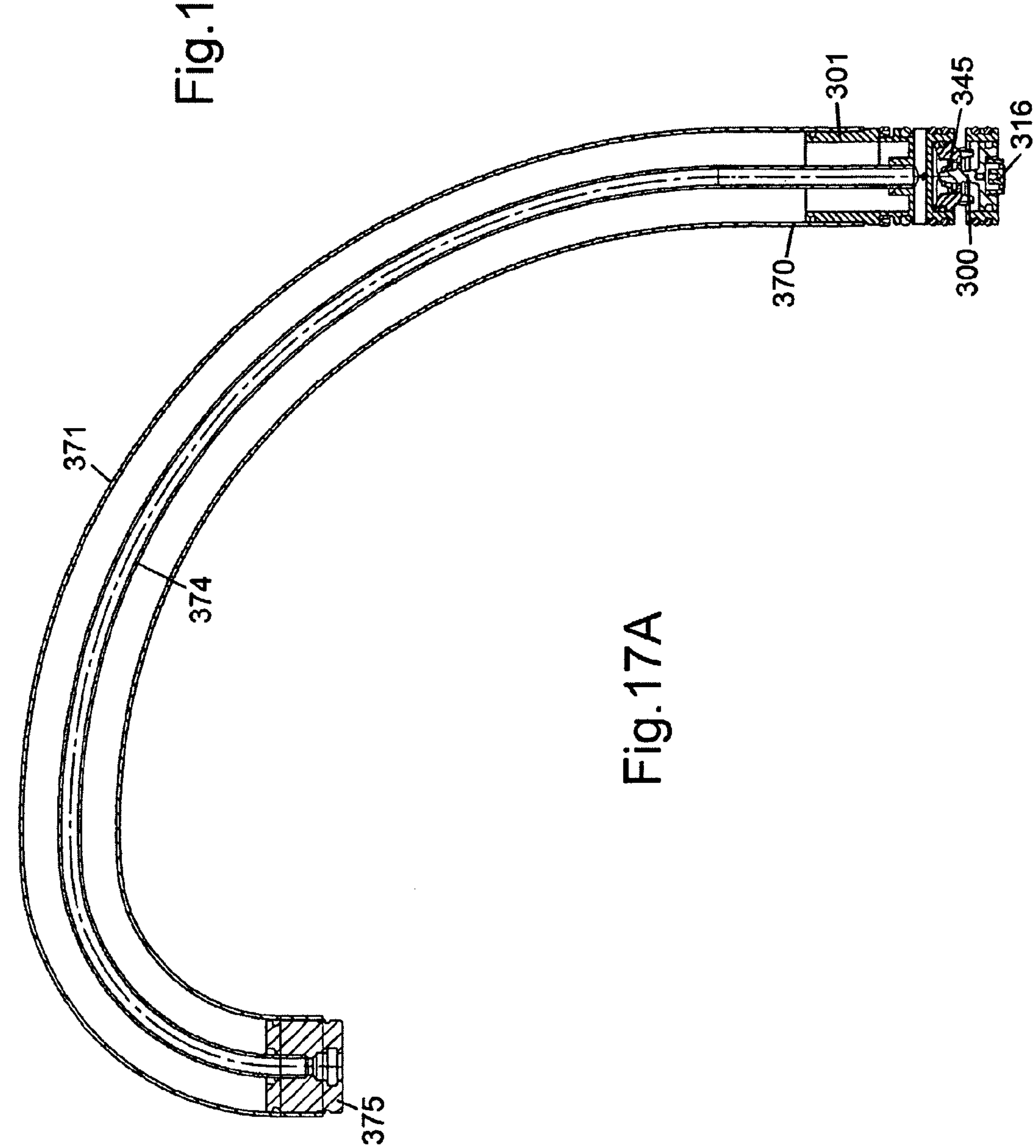
Figure 18A:
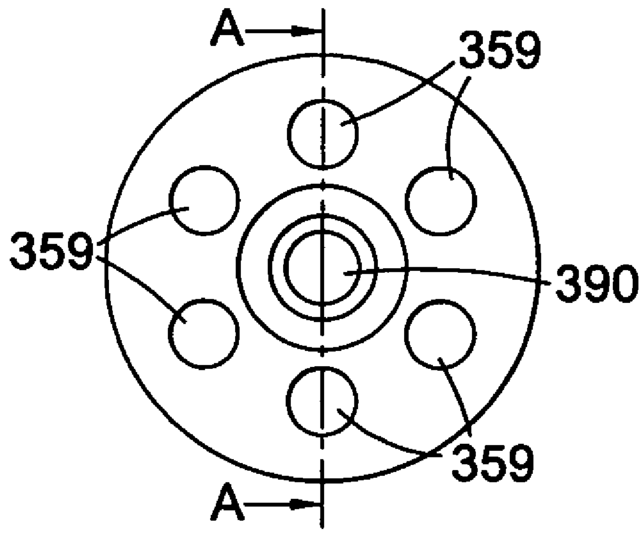
FIG. 18A shows a base view of the end-cap of the spout of FIG. 17.
Figure 18B:
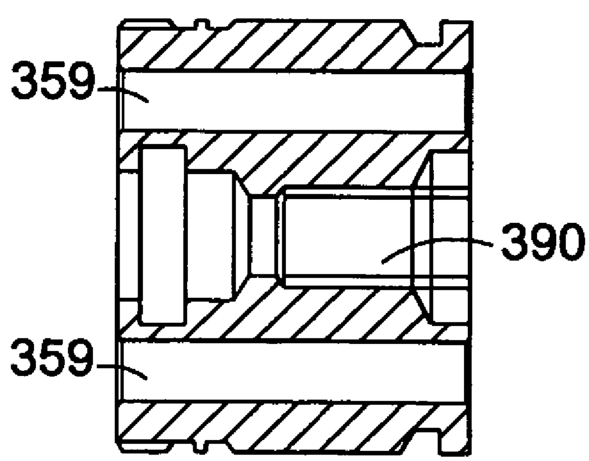
FIG. 18B shows a cross sectional view along line A—A of FIG. 18A.

FIG. 17A shows a side cross sectional view of the spout. FIG. 17D shows a front view. The end cap 375 and valve assembly can be seen. FIG. 18 shows a cross sectional view of the end cap 375, with the channels for the hot/cold water mixture, and the central channel 390 for the filtered water.

What is claimed is:

1. A diverter valve comprising a housing having an inlet, a first outlet, and a second outlet, a valve member mounted in said housing, movable between a closed position and an open position with respect to the first outlet, a piston member for moving said valve member, with said piston member being responsive to pressure differential between said second outlet and said inlet such that when a lower pressure exists at said second outlet, said piston member moves said valve member to said closed position, and a flow regulator adapted to regulate the flow through the second outlet, such that as the pressure in the housing increases, the restricting effect on the flow by the flow regulator increases, and as the pressure in the housing decreases, the restricting effect on the flow by the flow regulator decreases.

2. A diverter valve as claimed in claim 1, wherein said flow regulator comprises a variable sized flow channel, the size of the flow channel decreasing as the pressure in the housing increases, and the size of the flow channel increasing as the pressure in the housing decreases.

3. A diverter valve as claimed in claim 1, wherein said piston member comprises a first piston and a second piston, wherein the first piston is responsive to pressure differential between said second outlet and said inlet, the second piston is responsive to pressure differential between said first outlet and said inlet, and the first piston has a larger effective cross-section area than the second piston.

4. A diverter valve as claimed in claim 3, wherein the first piston comprises a rubber cup washer.

5. A diverter valve as claimed in claim 4, wherein the rubber cup washer is in an inverted position relative to the water flow in use so that a periphery of said cup washer presses against said housing.

6. A diverter valve as claimed in claim 3, wherein the second piston provides closure means for the first outlet.

7. A diverter valve, as claimed in claim 6, wherein said housing has an internal rim against which the second piston presses to close the first outlet.

8. A diverter valve, as claimed in claim 1, wherein said housing is comprised of an outer part, and an inner part which fits inside said outer part.

9. A diverter valve as claimed in claim 8, wherein a seal is provided to seal the first outlet shut when the valve member is in said second position.

10. A diverter valve, as claimed in claim 3, wherein channelling means is provided for channelling fluid through the flow regulator.

11. A diverter valve as claimed in claim 10, wherein said channelling means comprises one or more channels running through the first piston.

12. A diverter valve as claimed in claim 11, wherein the first piston has 6 channels arranged in a hexagonal pattern, running through it parallel to its axis.

13. A diverter valve, as claimed in claim 1, wherein leakage prevention means are provided for preventing fluid leakage from the second outlet any other than through the flow regulator.

14. A diverter valve, as claimed in claim 13, wherein said rubber cup washer provides said leakage prevention means.

15. A diverter valve, as claimed in claim 1, comprising a second inlet.

16. A diverter valve as claimed in claim 3, wherein the first piston has a tapered front surface.

17. A diverter valve, as claimed in claim 15, comprising a seal associated with said outlets for allowing isolation of said outlets from each other and from said inlets, when said outlets are connected to spout and spray units.

18. A diverter valve as claimed in claim 1, wherein said housing includes an isolated channel with an inlet and an outlet, the interior of said channel being isolated from the interior of the diverter valve.

19. A diverter valve assembly, comprising an outer body, the diverter valve of claim 1, a mixing chamber in the outer body connected to the valve inlet, outer body inlets in fluid communication with to said mixing chamber, and outer body outlets in fluid communication with the valve outlets.

20. A diverter valve assembly comprising a diverter valve as claimed in claim 1, and a spout connected to the first outlet, wherein said housing is attached to said spout.

21. A diverter valve assembly as claimed in claim 20, wherein said housing is integrated with said spout.

22. A diverter valve assembly comprising a diverter valve as claimed in claim 18, and a spout connected to the first outlet, wherein said housing is attached to said spout, and wherein said outlet of said isolated channel is also connected to said spout.

23. A diverter valve assembly as claimed in claim 22, wherein said spout comprises an outer tube and an inner tube, and wherein said first outlet is connected to the outer tube and said outlet of said isolated channel is connected to the inner tube.

24. A faucet including a diverter valve as claimed in claim 1, and including a channel for filtered water, said channel being isolated from said diverter valve.

25. A faucet including a diverter valve as claimed in claim 1, wherein two different fluid conduits enter the valve, one by each inlet, and the fluids mix together inside the housing.

26. A faucet as claimed in claim 25, wherein the two inlets are linked together outside the valve housing.

27. A faucet valve as claimed in claim 25, wherein the two fluids are hot water and cold water.

28. A faucet as claimed in claim 25, wherein the second outlet is linked to a spray unit, and the first outlet is linked to a spout.

29. A faucet as claimed in claim 25, wherein said faucet further comprises an inlet for filtered water and an outlet for filtered water, said inlet and outlet for filtered water being isolated from said diverter valve.

30. A faucet including a diverter valve as claimed in claim 18, wherein said faucet has an inlet which is connected to said isolated channel, and said faucet has an outlet which is connected to said isolated channel, wherein said isolated channel remains isolated from said diverter valve.

31. A faucet as claimed in claim 30, wherein said isolated channel is connected to a filtered water inlet.

32. A diverter valve for a water faucet, comprising a housing having an inlet, a first outlet, and a second outlet, a piston valve element mounted in said housing, movable between a closed position and an open position with respect to the first outlet, said valve element being responsive to pressure differential between said second outlet and said inlet such that when a lower pressure exists at said second outlet, said valve element moves to said closed position closing said first outlet, wherein said valve element comprises a cup washer in line between said inlet and said second outlet and which expands against said housing wall to inhibit vibration of said valve element, and wherein said piston valve includes a flow regulator to regulate the flow through the second outlet.

* * * * *